United States Patent
Wu et al.

(10) Patent No.: US 11,641,254 B2
(45) Date of Patent: May 2, 2023

(54) MULTI-RESOURCE-UNIT AGGREGATION

(71) Applicant: Apple Inc., Cupertino, CA (US)

(72) Inventors: Tianyu Wu, Fremont, CA (US); Yong Liu, Campbell, CA (US); Jinjing Jiang, San Jose, CA (US); Jarkko L. Kneckt, Los Gatos, CA (US); Lochan Verma, San Diego, CA (US); Qi Wang, Sunnyvale, CA (US); Su Khiong Yong, Palo Alto, CA (US); Anuj Batra, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/194,627

(22) Filed: Mar. 8, 2021

(65) Prior Publication Data

US 2021/0281363 A1 Sep. 9, 2021

Related U.S. Application Data

(60) Provisional application No. 62/986,812, filed on Mar. 9, 2020.

(51) Int. Cl.
*H04L 1/16* (2006.01)
*H04L 1/00* (2006.01)
(Continued)

(52) U.S. Cl.
CPC .......... *H04L 1/1621* (2013.01); *H04L 1/0057* (2013.01); *H04L 5/0007* (2013.01); *H04L 5/0098* (2013.01)

(58) Field of Classification Search
CPC ... H04L 1/1621; H04L 1/0057; H04L 5/0007; H04L 5/0098
See application file for complete search history.

(56) References Cited

U.S. PATENT DOCUMENTS 10,153,932 B2 12/2018 Montreuil et al.
10,211,948 B2 * 2/2019 Liu .................... H04L 27/2626
(Continued)

OTHER PUBLICATIONS

Coleman, David, What are OFDMA Resource Units in 802.11ax?, Oct. 13, 2018, https://web.archive.org/web/20181013182058/https://resources.wavonline.com/what-are-ofdma-resource-units-in-802-11ax/ (Year: 2018).*

*Primary Examiner* — Justin R Knapp
(74) *Attorney, Agent, or Firm* — Kowert, Hood, Munyon, Rankin & Goetzel, P.C.

(57) ABSTRACT

An electronic device (such as an access point) is described. This electronic device transmits an orthogonal frequency division multiple access (OFDMA) frame to a recipient electronic device (such as a client or a station). The OFDMA frame includes multiple predefined resource units (RUs) allocated to the recipient electronic device in a set of predefined RUs having associated frequency bandwidths. Moreover, the multiple predefined RUs include two or more first predefined RUs having a first number of tones less than a predefined amount, or two or more second predefined RUs having a second number of tones greater than or equal to the predefined amount. For example, the predefined amount may include 242 tones. Note that the multiple predefined RUs may have the same or different numbers of tones. Moreover, the electronic may receive an acknowledgment or a block acknowledgment from the recipient electronic device.

20 Claims, 15 Drawing Sheets

(51) Int. Cl.
*H04L 5/00* (2006.01)
*H04L 1/1607* (2023.01)

(56) References Cited

U.S. PATENT DOCUMENTS

| | | | |
|---|---|---|---|
| 10,298,365 | B2 | 5/2019 | Suh et al. |
| 11,115,163 | B2 * | 9/2021 | Noh .................... H04L 1/0041 |
| 11,252,749 | B2 * | 2/2022 | Hu ....................... H04L 1/004 |
| 2017/0237532 | A1 * | 8/2017 | Li ...................... H04L 5/0007 370/338 |
| 2017/0265210 | A1 | 9/2017 | Huang et al. |
| 2017/0272295 | A1 * | 9/2017 | Lee .................... H04L 27/2603 |
| 2021/0212035 | A1 * | 7/2021 | Son .................... H04W 72/121 |
| 2021/0314113 | A1 * | 10/2021 | Chen .................. H04L 5/0062 |

\* cited by examiner

OPTION 1

OPTION 2

MULTI-RESOURCE-UNIT AGGREGATION

CROSS-REFERENCE TO RELATED APPLICATION

This application claims the benefit of U.S. Provisional Application No. 62/986,812, entitled "Multi-Resource-Unit Aggregation," by Tianyu Wu, et al., filed Mar. 9, 2020, the contents of which are hereby incorporated by reference.

FIELD

The described embodiments relate, generally, to wireless communications among electronic devices, including techniques for multiple-resource-unit aggregation, e.g., to a single station or to multi-user multiple-input multiple-output (MU MIMO).

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi').

IEEE 802.11ax supports orthogonal frequency division multiple access (OFDMA) with the restriction that each station (which is sometimes referred to as a 'recipient electronic device' or a 'client') can only be assigned to one resource unit (RU). However, this approach is often inefficient. For example, when a number of OFDMA users is small, some RUs may be wasted. Notably, a center 26 tone RU in a 20 MHz physical layer convergence protocol (PLCP) protocol data unit (PPDU) may be wasted when the 20 MHz channel is assigned to two OFDMA users.

Alternatively, the existing approach may be inefficient in single-user transmission, when one or more secondary 20 MHz sub channels are not available, such as: when the secondary channel is dynamic frequency selection (DFS) active (which may, e.g., reduce an 80 MHz channel to a 20 MHz primary channel); or when narrow band interference exists in secondary channel. In these cases, a single-user transmission may need to reduce the bandwidth to 20 MHz, which is a large reduction in the spectrum efficiency.

SUMMARY

An electronic device that communicates a frame using multiple predefined RUs is described. This electronic device may include: a node (or a pad or a connector) that is communicatively coupled to an antenna; and an interface circuit (which is sometimes referred to as a 'communication circuit'), communicatively coupled to the node, that communicates with a recipient electronic device. During operation, the interface circuit may transmit, from the node, an OFDMA frame intended for the recipient electronic device, where the OFDMA frame includes the multiple predefined RUs allocated to the recipient electronic device in a set of predefined RUs having associated frequency bandwidths. Moreover, the multiple predefined RUs include two or more first predefined RUs having a first number of tones less than a predefined amount, or two or more second predefined RUs having a second number of tones greater than or equal to the predefined amount.

Note that the multiple predefined RUs may have different numbers of tones.

Moreover, the predefined amount may include 242 tones.

Furthermore, the two or more first predefined RUs may have a combined frequency bandwidth that does not cross a 20 MHz boundary among the set of predefined RUs. Additionally, the two or more second predefined RUs may be separated by a puncture hole corresponding to a frequency bandwidth excluding transmitted energy.

Moreover, the two or more first predefined RUs may be adjacent to each other and may be combined to form a contiguous frequency bandwidth. In some embodiments, the electronic device may perform: error coding using an error code of bits in the contiguous frequency bandwidth; interleaving of error encoded bits in the contiguous frequency bandwidth; parsing interleaved bits into the two or more first predefined RUs; and symbol mapping the interleaved bits in the two or more first predefined RUs using a common constellation for the two or more first predefined RUs. For example, the error code may include a binary convolution code. Furthermore, when dual sub-carrier modulation is applied, the interleaving may use interleaving parameters including: 9 columns, a number of rows equal to 4 or 7 times a number of bits per spatial stream per sub-carrier, and 2 or 11 rotations.

Alternatively or additionally, the electronic device may perform: error coding using an error code of bits in the contiguous frequency bandwidth; tone mapping of error encoded bits in the contiguous frequency bandwidth; parsing tone-mapped bits into the two or more first predefined RUs; and symbol mapping the tone-mapped bits in the two or more first predefined RUs using a common constellation or different constellations for the two or more first predefined RUs. Note that the error code may include a low-density parity-check code.

Furthermore, the electronic device may perform: error coding using an error code of bits in the two or more second predefined RUs; parsing error encoded bits into the two or more second predefined RUs; interleaving of the error encoded bits in the two or more second predefined RUs; and symbol mapping interleaved bits using a common constellation or different constellations for the two or more second predefined RUs. For example, the error code may include a binary convolution code.

Additionally, the electronic device may perform: error coding using an error code of bits in the two or more second predefined RUs; parsing error encoded bits into the two or more second predefined RUs; tone mapping the error encoded bits in the two or more second predefined RUs using a common tone-mapping technique or different tone mapping techniques for the two or more second predefined RUs; and symbol mapping tone-mapped bits using a common constellation or different constellations for the two or more second predefined RUs. For example, the error code may include a low-density parity-check code. Moreover, the different constellations may be used when the two or more predefined RUs are included in different frequency sub-blocks, and a given frequency sub-block may have an 80 MHz bandwidth. Furthermore, a given constellation may correspond to a given second predefined RU. Note that the tone mapping may use tone mapping parameters that include 726 tones with 702 data tones and 24 pilot tones, and the 702 data tones may include 18 tone mapping distances when dual sub-carrier modulation is not applied and nine tone mapping distances when dual sub-carrier modulation is applied. In some embodiments, the error encoded bits may be parsed using a round-robin paring technique to the two or more second predefined RUs or a sequential parsing technique to the two or more second predefined RUs.

Note that the two or more second predefined RUs in different frequency sub-blocks may use different modulation and coding scheme (MCS) levels, and a given frequency sub-block may have an 80 MHz bandwidth. For example, the MCS levels may be separated by one MCS level. Moreover, the two or more second predefined RUs with the different MCS levels may have a common number of tones. Furthermore, the different MCS levels for the two or more second predefined RUs may be specified in a single preamble field for the recipient electronic device. Notably, the different MCS levels may be specified by a modulation bitmap. Additionally, the different MCS levels for the two or more second predefined RUs may be specified in corresponding preamble fields for the recipient electronic device.

In some embodiments, the two or more second predefined RUs may use different MCS levels. For example, the MCS levels may be separated by one MCS level. Moreover, the two or more second predefined RUs with different MCS levels may have a common frequency bandwidth or may have frequency bandwidths that different by a factor of two. Furthermore, the different MCS levels for the two or more second predefined RUs may be specified in a single preamble field for the recipient electronic device. Notably, the different MCS levels may be specified by a modulation bitmap. Additionally, the different MCS levels for the two or more second predefined RUs may be specified in corresponding preamble fields for the recipient electronic device.

In some embodiments, the interface circuit may receive, at the node, an acknowledgment or a block acknowledgment associated with the recipient electronic device. The block acknowledgment may include information specifying link quality between the electronic device and the recipient electronic device. For example, the information may include: a received signal strength indication (RSSI), a signal-to-interference-and-noise ratio (SINR), a transmit power, a recommended MCS level, a recommended number of spatial streams, or a low-density parity-check codeword error rate (WER). Moreover, the interface circuit may perform link adaptation based at least in part on the information, where the link adaptation is performed for a given predefined RU or for a given frequency sub-block comprising an 80 MHz bandwidth. Note that the link adaptation may provide an additional MCS level with an additional data rate per sub-carrier per spatial stream.

Other embodiments provide the integrated circuit for use with the electronic device.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for communicating the frame. The method includes at least some of the aforementioned operations performed by the electronic device.

Other embodiments provide a recipient electronic device. This recipient electronic device may include: a node (or a pad or a connector) that is communicatively coupled to an antenna; and a second interface circuit (which is sometimes referred to as a 'second communication circuit'), communicatively coupled to the node, that communicates with an electronic device. During operation, the second interface circuit may receive, at the node, an OFDMA frame associated with the electronic device, where the OFDMA frame includes multiple predefined RUs allocated to the recipient electronic device in a set of predefined RUs having associated frequency bandwidths. Moreover, the multiple RUs include two or more first predefined RUs having a first number of tones less than a predefined amount, or two or more second predefined RUs having a second number of tones greater than or equal to the predefined amount.

Moreover, the second interface circuit may provide, from the node, an acknowledgment intended for the electronic device.

Other embodiments provide the second integrated circuit for use with the recipient electronic device.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for communicating the frame. The method includes at least some of the aforementioned operations performed by the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
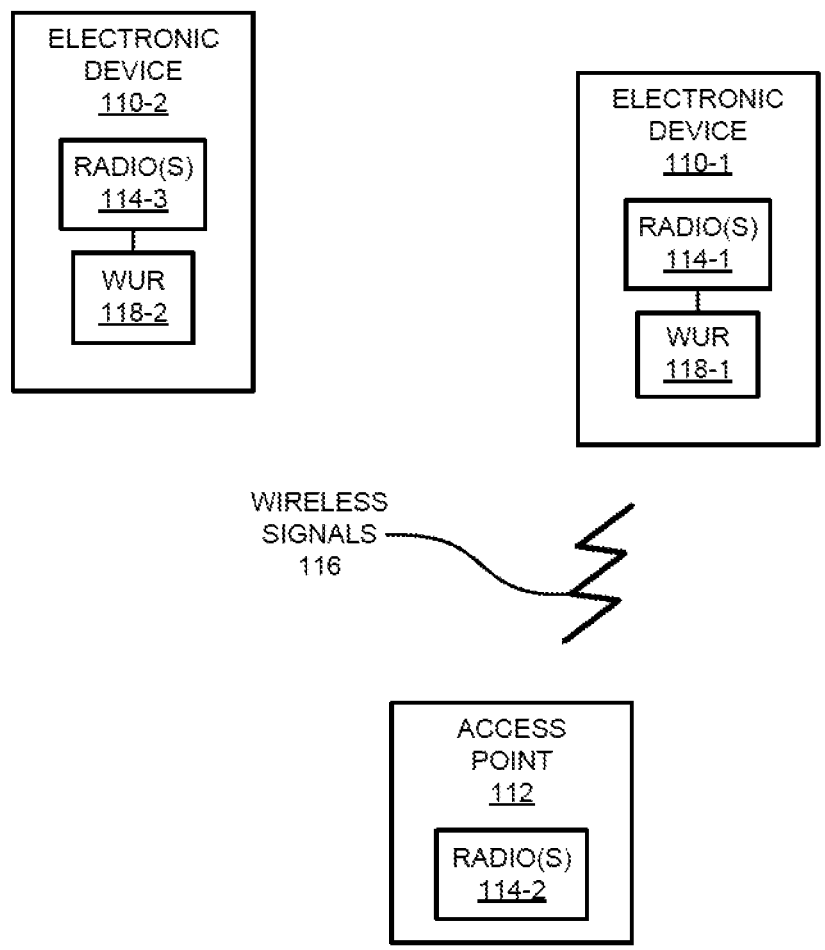
FIG. 1 is a block diagram illustrating an example of communication between electronic devices.

An electronic device (such as an access point) is described. This electronic device may transmit an OFDMA frame to a recipient electronic device (such as a client or a station). The OFDMA frame may include multiple predefined RUs allocated to the recipient electronic device in a set of predefined RUs having associated frequency bandwidths. Moreover, the multiple predefined RUs may include two or more first predefined RUs having a first number of tones less than a predefined amount, or two or more second predefined RUs having a second number of tones greater than or equal to the predefined amount. For example, the predefined amount may include 242 tones. Note that the multiple predefined RUs may have the same or different numbers of tones. Moreover, the electronic may receive an acknowledgment or a block acknowledgment from the recipient electronic device.

By communicating the frame using multiple predefined RUs, the communication techniques may allow the electronic device and the recipient electronic device to more-efficiently use the available set of predefined RUs. For example, the communication techniques may avoid wasting or not using some of the RUs, such as the center 26 tone RU in a 20 MHz PLCP PPDU. Alternatively or additionally, the communication techniques may allow the electronic device and the recipient electronic device to use portions of an 80 MHz channel when one or more secondary 20 MHz sub channels are not available. Consequently, the communication techniques may increase the spectrum efficiency of the communication between the electronic device and the recipient electronic device. These capabilities may facilitate improved communication performance of the electronic device and/or the recipient electronic device(s), which may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have a connection with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 14:
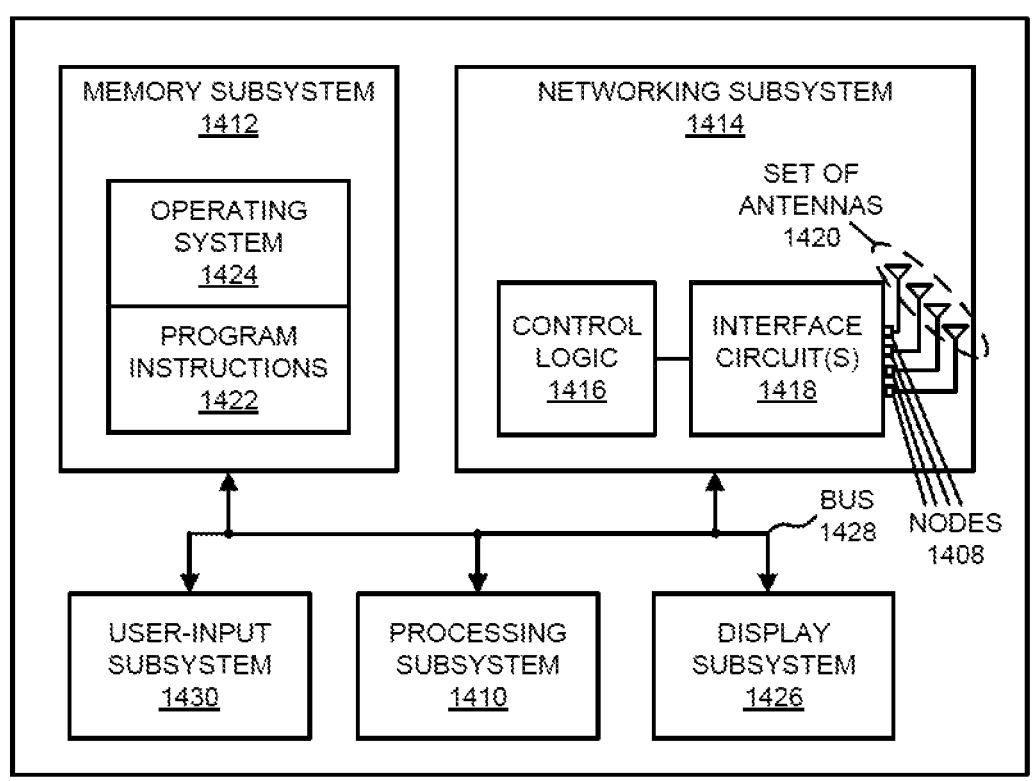
FIG. 14 is a block diagram illustrating an example of an electronic device of FIG. 1.

As described further below with reference to FIG. 14, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-13, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, one or more of electronic devices 110 and access point 112 may communicate frames. However, when only one predefined RU is assigned to a given electronic device (such as electronic device 110-1), the spectrum efficiency may be degraded. Notably, one or more predefined RUs and/or available bandwidth may be wasted. These difficulties may have an adverse impact on the communication performance, which may degrade the user experience and customer satisfaction.

In order to address this challenge, as described below with reference to FIGS. 2-13, in some embodiments of the disclosed communication techniques access point 112 may communicate the frames to a given electronic device (such as electronic device 110-1) using two or more predefined RUs. Notably, access point 112 may communicate an OFDMA frame to electronic device 110-1 using multiple predefined RUs that are allocated to electronic device 110-1 in a set of predefined RUs having associated frequency bandwidths. The multiple predefined RUs may include two or more first predefined RUs having a first number of tones less than a predefined amount, or two or more second predefined RUs having a second number of tones greater than or equal to the predefined amount. For example, the predefined amount may include 242 tones.

Note that the multiple predefined RUs may have different numbers of tones. Moreover, the two or more first predefined RUs may have a combined frequency bandwidth that does not cross a 20 MHz boundary among the set of predefined RUs. Furthermore, the two or more second predefined RUs may be separated by a puncture hole corresponding to a frequency bandwidth excluding transmitted energy.

Additionally, the two or more first predefined RUs may be adjacent to each other and may be combined to form a contiguous frequency bandwidth. In some embodiments, access point 112 may perform: error coding using an error code of bits in the contiguous frequency bandwidth; interleaving of error encoded bits in the contiguous frequency bandwidth; parsing interleaved bits into the two or more first predefined RUs; and symbol mapping the interleaved bits in the two or more first predefined RUs using a common constellation for the two or more first predefined RUs. For example, the error code may include a binary convolution code. Furthermore, when dual sub-carrier modulation is applied, the interleaving may use interleaving parameters including: 9 columns, a number of rows equal to 4 or 7 times a number of bits per spatial stream per sub-carrier, and 2 or 11 rotations.

Alternatively or additionally, access point 112 may perform: error coding using an error code of bits in the contiguous frequency bandwidth; tone mapping of error encoded bits in the contiguous frequency bandwidth; parsing tone-mapped bits into the two or more first predefined RUs; and symbol mapping the tone-mapped bits in the two or more first predefined RUs using a common constellation or different constellations for the two or more first predefined RUs. Note that the error code may include a low-density parity-check code.

Moreover, access point 112 may perform: error coding using an error code of bits in the two or more second predefined RUs; parsing error encoded bits into the two or more second predefined RUs; interleaving of the error encoded bits in the two or more second predefined RUs; and symbol mapping interleaved bits using a common constellation or different constellations for the two or more second predefined RUs. For example, the error code may include a binary convolution code.

Furthermore, access point 112 may perform: error coding using an error code of bits in the two or more second predefined RUs; parsing error encoded bits into the two or more second predefined RUs; tone mapping the error encoded bits in the two or more second predefined RUs using a common tone-mapping technique or different tone mapping techniques for the two or more second predefined RUs; and symbol mapping tone-mapped bits using a common constellation or different constellations for the two or more second predefined RUs. For example, the error code may include a low-density parity-check code. Moreover, the different constellations may be used when the two or more predefined RUs are included in different frequency sub-blocks, and a given frequency sub-block may have an 80 MHz bandwidth. Furthermore, a given constellation may correspond to a given second predefined RU. Note that the tone mapping may use tone mapping parameters that include 726 tones with 702 data tones and 24 pilot tones, and the 702 data tones may include 18 tone mapping distances when dual sub-carrier modulation is not applied and nine tone mapping distances when dual sub-carrier modulation is applied. In some embodiments, the error encoded bits may be parsed using a round-robin paring technique to the two or more second predefined RUs or a sequential parsing technique to the two or more second predefined RUs.

Note that the two or more second predefined RUs in different frequency sub-blocks may use different MCS levels, and a given frequency sub-block may have an 80 MHz bandwidth. For example, the MCS levels may be separated by one MCS level. Moreover, the two or more second predefined RUs with the different MCS levels may have a common number of tones. Furthermore, the different MCS levels for the two or more second predefined RUs may be specified in a single preamble field for electronic device 110-1. Notably, the different MCS levels may be specified by a modulation bitmap. Additionally, the different MCS levels for the two or more second predefined RUs may be specified in corresponding preamble fields for electronic device 110-1.

In some embodiments, the two or more second predefined RUs may use different MCS levels. For example, the MCS levels may be separated by one MCS level. Moreover, the two or more second predefined RUs with different MCS levels may have a common frequency bandwidth or may have frequency bandwidths that different by a factor of two. Furthermore, the different MCS levels for the two or more second predefined RUs may be specified in a single preamble field for electronic device 110-1. Notably, the different MCS levels may be specified by a modulation bitmap. Additionally, the different MCS levels for the two or more second predefined RUs may be specified in corresponding preamble fields for electronic device 110-1.

Moreover, access point 112 may receive an acknowledgment or a block acknowledgment from electronic device 110-1. The block acknowledgment may include information specifying link quality between access point 112 and electronic device 110-1. For example, the information may include: a received signal strength indication (RSSI), a signal-to-interference-and-noise ratio (SINR), a transmit power, a recommended MCS level, a recommended number of spatial streams, or a low-density parity-check codeword error rate (WER). Moreover, access point 112 may perform link adaptation based at least in part on the information, where the link adaptation is performed for a given predefined RU or for a given frequency sub-block comprising an 80 MHz bandwidth. Note that the link adaptation may provide an additional MCS level with an additional data rate per sub-carrier per spatial stream.

In summary, the communication techniques may allow electronic devices 110 and access point 112 to communicate OFDMA frames efficiently, e.g., with spectral efficiency. Thus, the communication techniques may reduce or eliminate wasted available predefined RUs and/or bandwidth. These capabilities may facilitate improved communication performance of the electronic devices 110 and access point 112, and thus may improve the user experience and customer satisfaction.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques.

Figure 2:
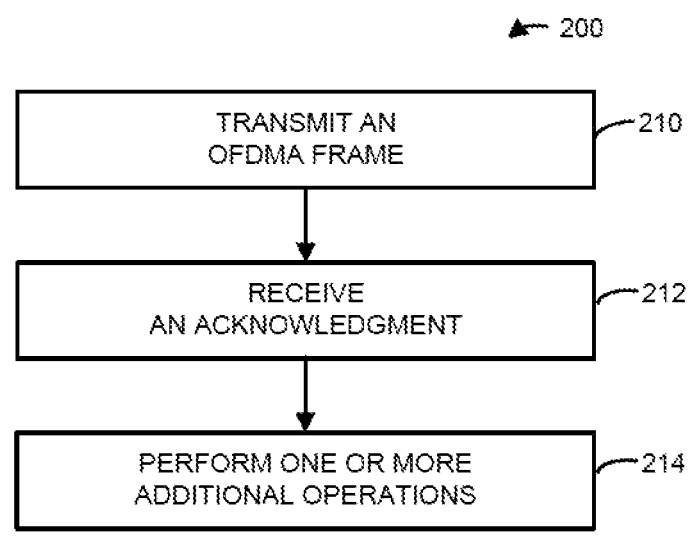
FIG. 2 is a flow diagram illustrating an example method for communicating a frame using an electronic device of FIG. 1.

FIG. 2 presents a flow diagram illustrating an example method 200 for communicating a frame. This method may be performed by an electronic device, such as access point 112 in FIG. 1. Note that the communication with a recipient electronic device may be compatible with an IEEE 802.11 communication protocol.

During operation, the electronic device may transmit an OFDMA frame (operation 210) addressed to the recipient electronic device, where the OFDMA frame includes the multiple predefined RUs allocated to the recipient electronic device in a set of predefined RUs having associated frequency bandwidths. Moreover, the multiple predefined RUs include two or more first predefined RUs having a first number of tones less than a predefined amount, or two or more second predefined RUs having a second number of tones greater than or equal to the predefined amount.

Then, the electronic device may receive an acknowledgment (operation 212) from the recipient electronic device. Note that in some embodiments the acknowledgment may include a block acknowledgment.

In some embodiments, the electronic device performs one or more optional additional operations (operation 214). For example, a variety of encoding operations may be performed to encode or provide the OFDMA frame.

Figure 3:
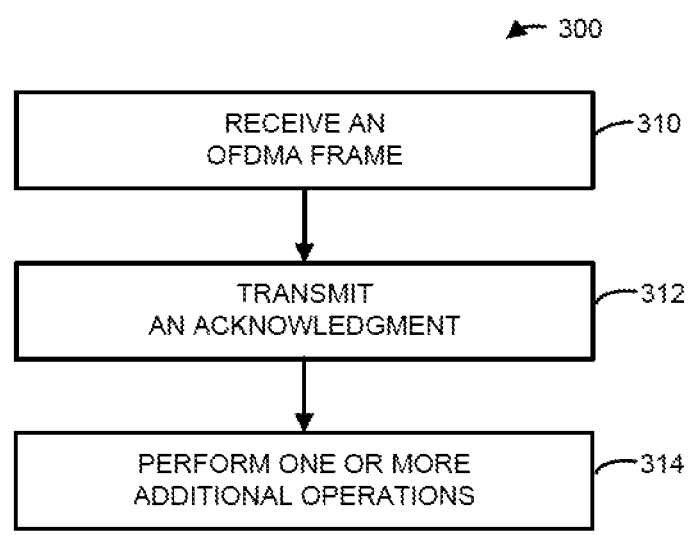
FIG. 3 is a flow diagram illustrating an example method for communicating a frame using an electronic device of FIG. 1.

FIG. 3 presents a flow diagram illustrating an example method 300 for communicating a frame. This method may be performed by a recipient electronic device, such as electronic device 110-1 in FIG. 1. Note that the communication with an electronic device may be compatible with an IEEE 802.11 communication protocol.

During operation, the recipient electronic device may receive an OFDMA frame (operation 310) from the recipient electronic device, where the OFDMA frame includes multiple predefined RUs allocated to the recipient electronic device in a set of predefined RUs having associated frequency bandwidths. Moreover, the multiple RUs include two or more first predefined RUs having a first number of tones less than a predefined amount, or two or more second predefined RUs having a second number of tones greater than or equal to the predefined amount.

Then, the recipient electronic device may provide an acknowledgment (operation 312) addressed to the electronic device. Note that in some embodiments the acknowledgment may include a block acknowledgment.

In some embodiments, the recipient electronic device performs one or more optional additional operations (operation 314). For example, a variety of decoding operations may be performed to decode or receive information included in the OFDMA frame.

In some embodiments of method 200 (FIG. 2) and/or 300 there may be additional or fewer operations. Further, one or more different operations may be included. Moreover, the order of the operations may be changed, and/or two or more operations may be combined into a single operation or performed at least partially in parallel.

Figure 4:
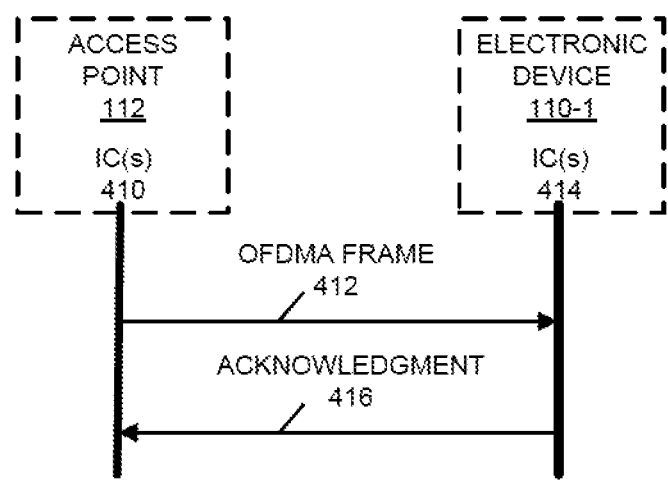
FIG. 4 is a drawing illustrating an example of communication among components in the electronic devices of FIG. 1.

The communication techniques are further illustrated in FIG. 4, which presents a flow diagram illustrating an example of communication among components in electronic device 110-1 and access point 112. During operation, one or more integrated circuits (ICs) 410 in access point 112 may transmit an OFDMA frame 412 addressed to electronic device 110-1, where the OFDMA frame includes the multiple predefined RUs allocated to electronic device 110-1 in the set of predefined RUs having associated frequency bandwidths.

After receiving OFDMA frame 412, one or more integrated circuits 414 in electronic device 110-1 may transmit an acknowledgment 416 to access point 112. The one or more integrated circuit 414 may receive acknowledgment 416.

While communication between the components in FIG. 4 are illustrated with unilateral or bilateral communication (e.g., lines having a single arrow or dual arrows), in general a given communication operation may be unilateral or bilateral.

Figure 5A:
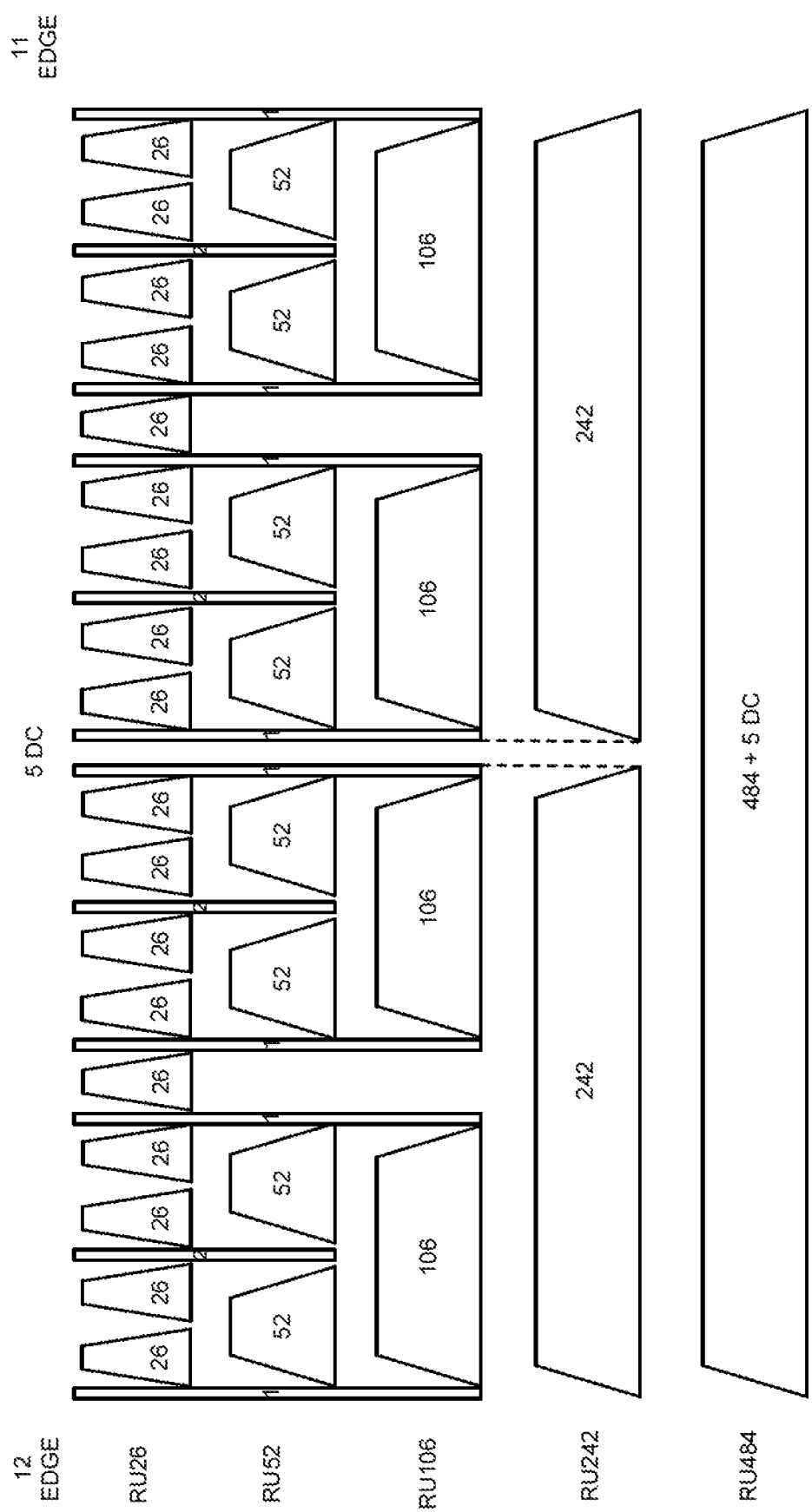
FIG. 5A is a drawing illustrating an example of multiple resource unit (RU) aggregation by one of the electronic devices of FIG. 1.
Figure 5B:
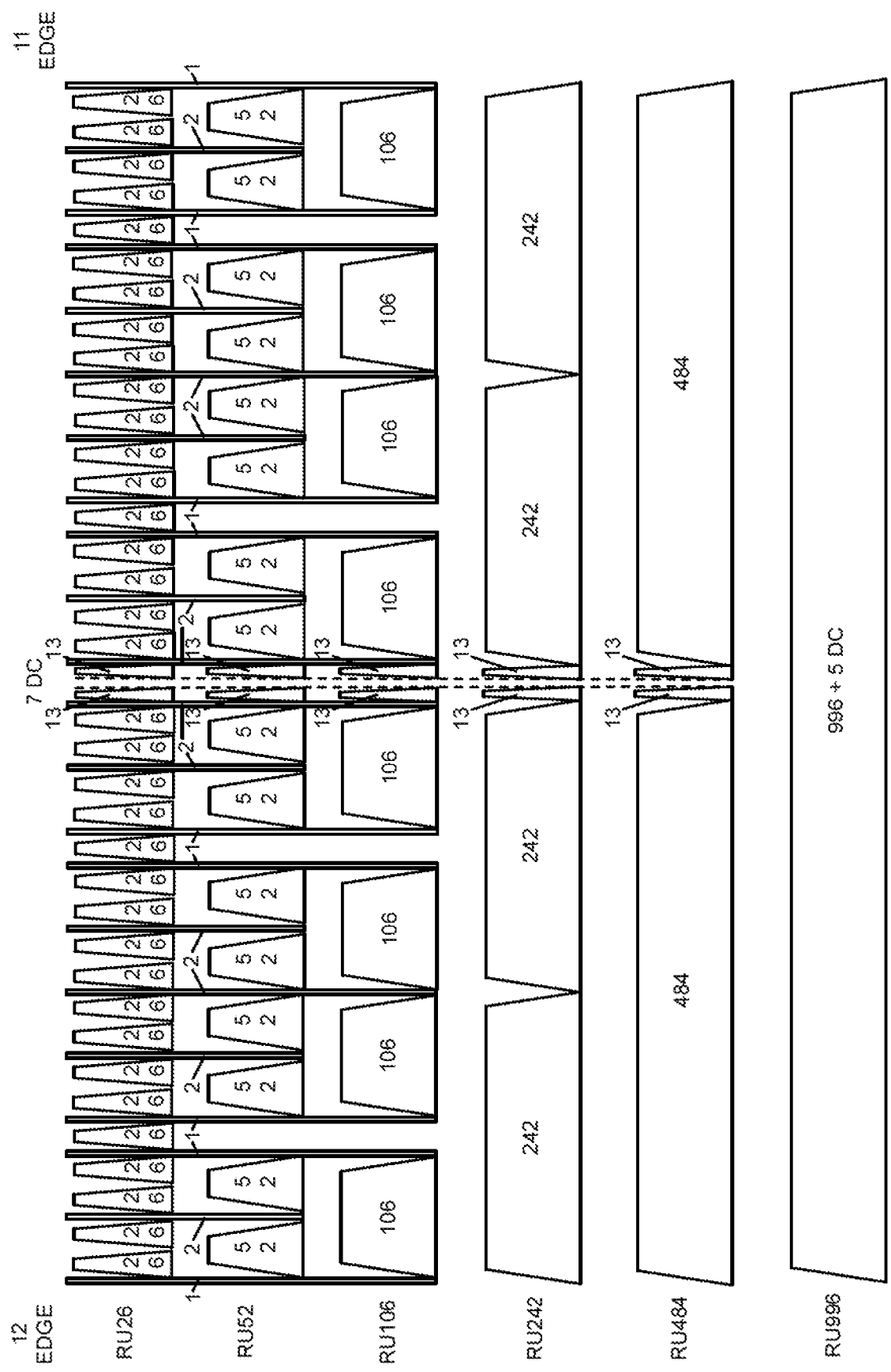
FIG. 5B is a drawing illustrating an example of multiple resource unit (RU) aggregation by one of the electronic devices of FIG. 1.

In some embodiments, the communication techniques address problems associated with spectral inefficiency by allowing multiple-RU aggregation. Notably, as shown in FIGS. 5A and 5B, which presents drawings illustrating examples of multiple RU aggregation, allowing multiple-RU aggregation can improve the spectrum efficiency in many cases. For example, RUs with the same or a different number of tones may be allocated to a single station.

However, this capability raises several problems that need to be solved to enable multiple-RU aggregation. Notably: which RUs can be combined as a combined RU for a station? Is joint encoding used for the combined RU or is separate encoding used on each RU? Is joint interleaving/tone mapping used across the combined RU or is per RU interleaving/tone mapping used? For joint encoding, is same modulation used across the combined RU or is per-RU modulation allowed? How is link adaptation performed when per-RU modulation is supported? How is per-RU modulation signaled?

In some embodiments, there may be different modes of RU combinations. Notably, a small RU is defined as an RU size less than a 242 tone RU (or 20 MHz), including: a 26 tone RU, a 52 tone RU or a 106 tone RU. Moreover, a large RU is defined as an RU size greater than or equal to a 242 tone RU, including: a 242 tone RU, a 484 tone RU, a 996 tone RU or a 2×996 tone RU. Note that, for a PPDU bandwidth greater than 80 MHz, each 80 MHz segment may be defined as a frequency sub-block.

In order to reduce the modes/complexity, a small RU may only be combined with a small RU and a large RU may only be combined with one or more large RUs. Moreover, a combination of small RUs may not across a 20 MHz channel boundary. Furthermore, neighboring small RUs may be combined to form a contiguous combined RU.

The possible RU combination modes may include: small RU combinations, such as a 52 tone RU with a 26 tone RU, or a 106 tone RU with a 26 tone RU. Note that some small RU combination (such as a 26 tone RU and a 26 tone RU, or a 52 tone RU and a 52 tone RUN) may not bring benefit compared to a 52 tone 52 combined with a 106 tone RU. Moreover, some modes (such as a 106 tone RU and a 106 tone RU, or a 106 tone RU and a 52 tone RU) may not be allowed, because the combined RU is not contiguous.

Furthermore, large RU combinations may include any RU combination that has a single punctured hole of 20, 40 or 80 MHz. Note that there may not be any transmitted energy in a punctured hole.

For example, an 80 MHz PPDU may include a combination of a 242 tone RU and a 484 tone RU; a 160 MHz PPDU may include a combination of a 242 tone RU, a 484 tone RU and a 996 tone RU; a 160 MHz PPDU may include a combination of a 484 tone RU and a 996 tone RU; a 240 MHz PPDU may include a combination of a 484 tone RU, a 996 tone RU and a 996 tone RU; a 240 MHz PPDU may include a combination of a 996 tone RU and a 996 tone RU; a 320 MHz PPDU may include a combination of a 484 tone RU, a 996 tone RU, a 996 tone RU and a 996 tone RU; and a 320 MHz PPDU may include a combination of a 996 tone RU, a 996 tone RU, and a 996 tone RU.

Figure 6A:
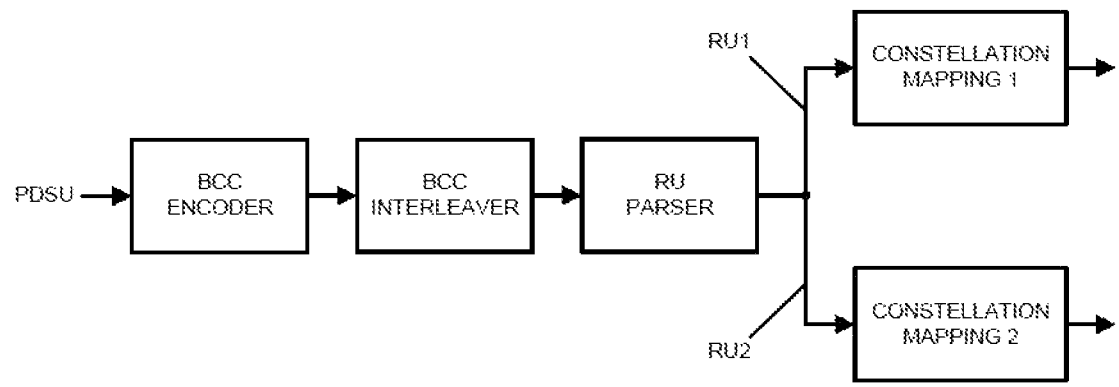
FIG. 6A is a drawing illustrating an example of transmission on combined or aggregated multiple RUs by one of the electronic devices of FIG. 1.
Figure 6B:
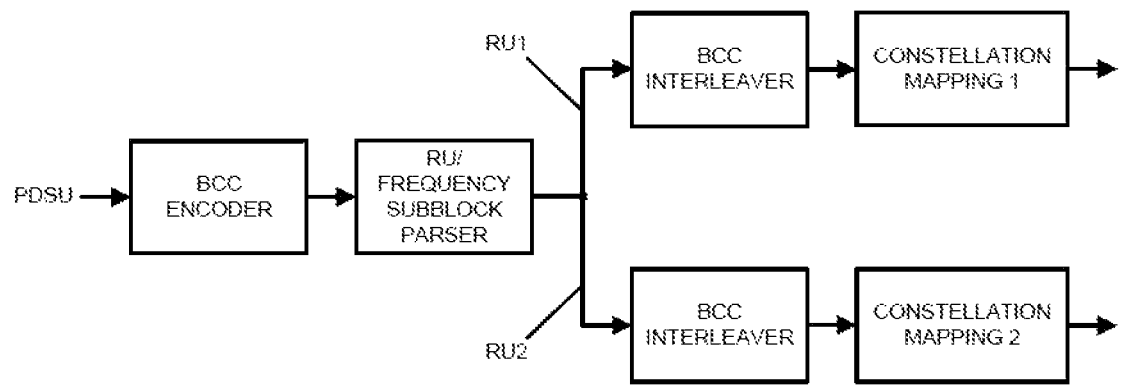
FIG. 6B is a drawing illustrating an example of multiple RU aggregation by one of the electronic devices of FIG. 1.
Figure 7A:
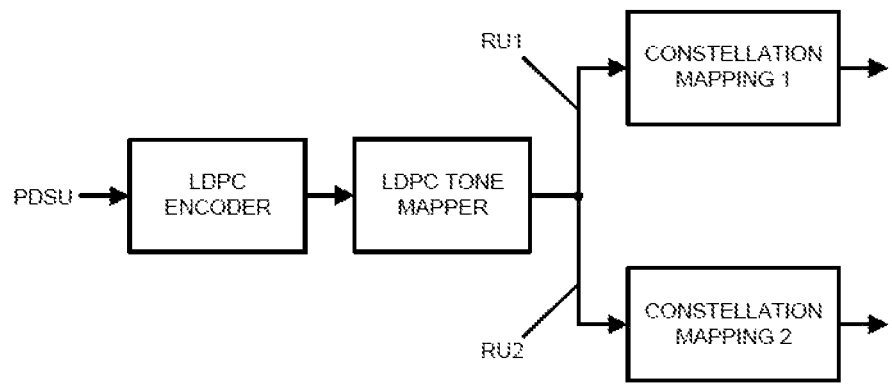
FIG. 7A is a drawing illustrating an example of multiple RU aggregation by one of the electronic devices of FIG. 1.
Figure 7B:
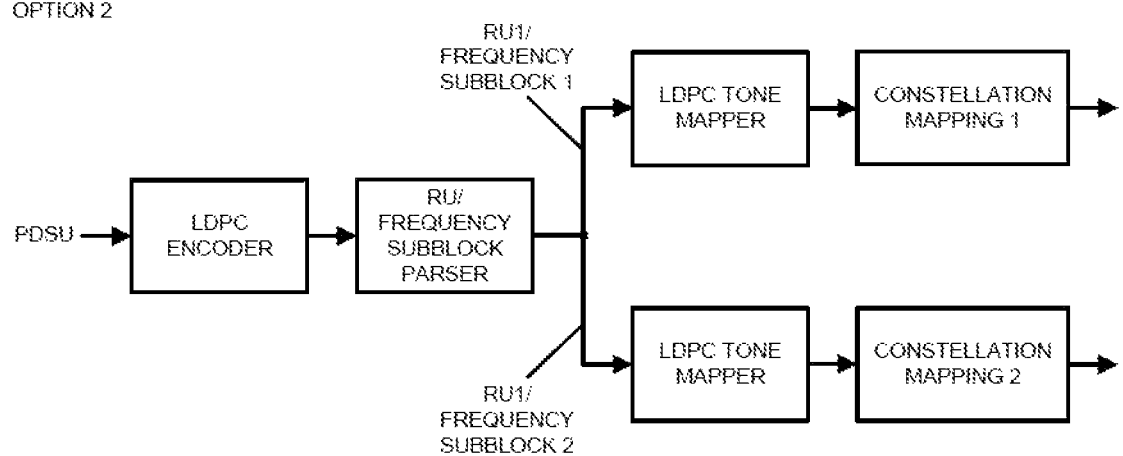
FIG. 7B is a drawing illustrating an example of multiple RU aggregation by one of the electronic devices of FIG. 1.

Moreover, there may be different options for transmission on combined or aggregated multiple RUs. Notably, transmission on a combined or aggregated RU may impact binary convolution coding (BCC) and/or low-density parity coding (LDPC). FIGS. 6A and 6B present drawings illustrating examples of transmission on combined or aggregated multiple RUs for use with BCC. Moreover, FIGS. 7A and 7B present drawings illustrating examples of multiple RU aggregation for use with LDPC. Note that in FIGS. 6A-7B, padding, scrambling and spatial stream parsing operations are not shown.

As shown in FIG. 6A, for a small-size RU combination with BCC, a first option may be used, in which the combined RU may be used as the new RU size. A PLCP service data unit (PSDU), which is the name of a media access control (MAC) protocol data unit (MPDU) in the physical layer, may undergo BCC encoding, BCC interleaving and then may be parsed into different RUs, such as a first RU (RU 1) and a second RU (RU 2). Note that the same modulation level may be used for the constellation mapping for RU 1 and RU 2.

Alternatively, as shown in FIG. 6B, for a large-size RU aggregation or combination with BCC, a second option may be used, in which a PSDU may undergo BCC encoding and then may be parsed into different RUs or frequency sub-blocks, such as RU 1 and RU 2. Then, a given RU may undergo BCC interleaving and constellation mapping. However, the modulation level used for the constellation mapping for RU 1 and RU 2 may be different.

Furthermore, as shown in FIG. 7A, for a small-size RU combination with LDPC, a first option may be used, in which the combined RU may be used as the new RU size. A PSDU may undergo LDPC encoding, a new LDPC tone mapping and then may be parsed into different RUs, such as RU 1 and RU 2. Note that the same modulation level may be used for the constellation mapping for RU 1 and RU 2.

Alternatively, for a large-size RU aggregation or combination within a frequency sub-block with LDPC, a first option may be used, in which a PSDU may undergo LDPC encoding, a new LDPC tone mapping and then may be parsed into different RUs or frequency sub-blocks, such as RU 1 and RU 2. However, as shown in FIG. 7B, for a large-size RU aggregation or combination across frequency sub-blocks with LDPC, a second option may be used, in which a new RU parser that parses the coded bits into the frequency sub-blocks may be defined. Note that the modulation level used for the constellation mapping for RU 1 and RU 2 may be different.

Additionally, for a small-size RU combination, the BCC first option in FIG. 6A and the LDPC first option transmission diagram in FIG. 7A may be used. Note that a small-size RU combination may have two modes: a 52 tone RU combined with a 26 tone RU, which may include a total of 78 tones, including 72 data tones and 6 pilot tones; or a 106 tone RU combined with a 26 tone RU, which may include a total of 132 tones, including 126 data tones and 6 pilot tones. As shown Table 1, new BCC interleaver parameters (including a number of rows corresponding to a number of bits per spatial stream per sub-carrier or Nbpsc, a number of columns and a number rotations). In addition, as shown in Tables 2 and 3, LDPC tone mapper parameters (including LDPC tone mapping distance parameter $D_{TM}$) may be used for small RU combination.

TABLE 1

| DCM | Parameter | RU Size (Tones) | |
|---|---|---|---|
| | | 78 | 132 |
| Not used | $N_{COL}$ | 18 | 18 |
| | $N_{ROW}$ | 4 · Nbpscs | 7 · Nbpscs |
| | $N_{ROT}$ | 11 | 29 |
| Used | $N_{COL}$ | 9 | 9 |
| | $N_{ROW}$ | 4 · Nbpscs | 7 · Nbpscs |
| | $N_{ROT}$ | 2 | 11 |

TABLE 2

| Parameter | RU Size (Tones) | |
|---|---|---|
| | 78 | 132 |
| $D_{TM}$ | 4 | 6 |
| $D_{TM\_DCM}$ | 2 | 3 |

TABLE 3

| Parameter | RU Size (Tones) | |
|---|---|---|
| | 78 | 132 |
| $D_{TM}$ | 6 | 7 |
| $D_{TM\_DCM}$ | 3 | 3 |

Moreover, a few more options for new BCC interleaver parameters and LDPC tone mapper parameters are provided.

Notably, the BCC interleaver parameters may include: for a 52 tone RU and a 26 tone RU combination with no dual sub-carrier modulation or $D_{CM}$, the number of columns may equal 72/K, and the number of rows may equal K×Nbpscs, where K may be 2, 3, 4, 6 or 8; for a 52 tone RU and a 26 tone RU combination with $D_{CM}$, the number of columns may equal 36/K, and the number of rows may equal K×Nbpscs, where K may be 2, 3 or 4; for a 106 tone RU and a 26 tone RU combination with no $D_{CM}$, the number of columns may equal 126/K, and the number of rows may equal K×Nbpscs, where K may be 2, 3, 6, 7 or 9; and for a 106 tone RU and a 26 tone RU combination with $D_{CM}$, the number of columns may equal 63/K, and the number of rows may equal K×Nbpscs, where K may be 3 or 7.

Furthermore, the LDPC tone mapper parameters may include: for a 52 tone RU and a 26 tone RU combination with no $D_{CM}$, $D_{TM}$ may equal K, where K may be 2, 3, 4, 6 or 8; for a 52 tone RU and a 26 tone RU combination with $D_{CM}$, $D_{TM\_DCM}$ may equal K, where K may be 2, 3, 4 or 6; for a 106 tone RU and a 26 tone RU combination with no $D_{CM}$, $D_{TM}$ may equal K, where K may be 2, 3, 6, 7 or 9; and for a 106 tone RU and a 26 tone RU combination with $D_{CM}$, $D_{TM\_DCM}$ may equal K, where K may be 3 or 7. Table 4 presents examples of LDPC tone mapper parameters.

TABLE 4

| Parameter | RU Size (Tones) | | |
|---|---|---|---|
| | 78 | 132 | 726 |
| $D_{TM}$ | 4 | 6 | 18 |
| $D_{TM\_DCM}$ | 2 | 3 | 9 |

Figure 8:
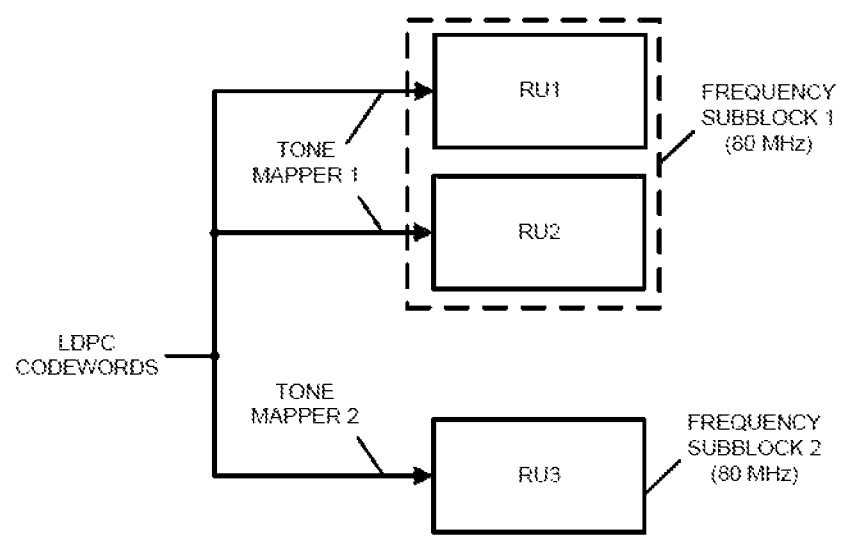
FIG. 8 is a drawing illustrating an example of multiple RU aggregation by one of the electronic devices of FIG. 1.

As shown in FIG. 8, which presents is a drawing illustrating an example of multiple RU aggregation, for a large-size RU combination, there may be multiple possible modes, including: a 242 tone RU and a 484 tone RU; a 242 tone RU, a 484 tone RU and a 996 tone RU; a 484 tone RU and a 996 tone RU; a 484 tone RU, a 996 tone RU and a 996 tone RU; a 484 tone RU, a 996 tone RU, a 996 tone RU, and a 996 tone RU; a 996 tone RU and a 996 tone RU; and 996 tone RU, a 996 tone RU and a 996 tone RU. Note that a large-size RU combination or aggregation may be classified as: an inner-frequency sub-block large-size RU aggregation, in which all the aggregated RUs are within one frequency sub-block; and an inter-frequency sub-block large-size RU aggregation, in which the aggregated RUs are located in different frequency sub-blocks.

Moreover, for a LDPC tone mapper, separate LDPC tone mappers may be applied to each frequency sub-block. For a combination of RUs from different frequency sub-blocks, each frequency sub-block may use its own LDPC tone mapping parameters. If different modulation for inner-frequency sub-block large RU aggregation is allowed, a per-RU LDPC tone mapper may be needed. Furthermore, within each frequency sub-block, there may be only one new size: a 242 tone RU and a 484 tone RU combination, with a total of 726 tones, including 702 data tones. For this new size, new LDPC tone mapping parameters may be defined. Alternatively, the individual LDPC tone mapper may be applied to the 242 tone RU and the 484 tone RU, and the LDPC tone mapping parameters for the 242 tone RU and the 484 tone RU may be reused. Table 5 presents examples of LDPC tone mapping parameters.

TABLE 5

| Parameter | RU Size (Tones) 726 |
|---|---|
| $D_{TM}$ | 18 |
| $D_{TM\_DCM}$ | 9 |

Figure 9A:
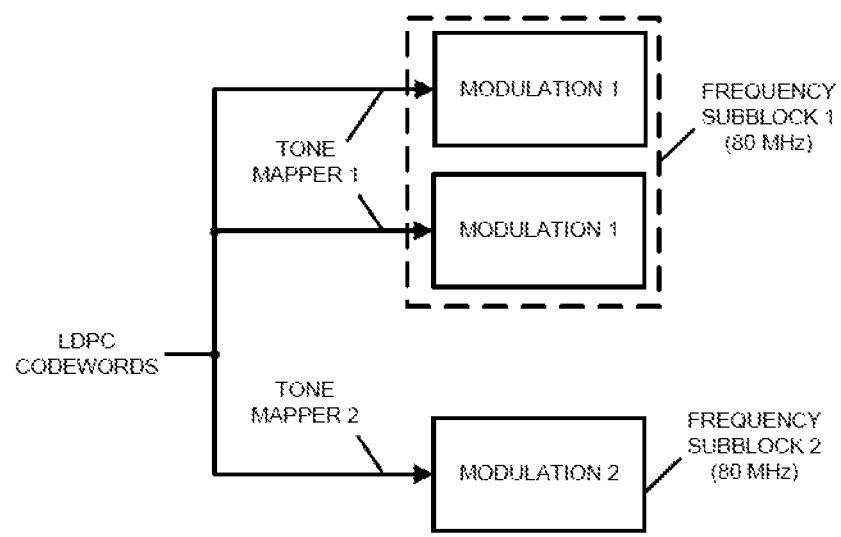
FIG. 9A is a drawing illustrating an example of multiple RU aggregation by one of the electronic devices of FIG. 1.
Figure 9B:
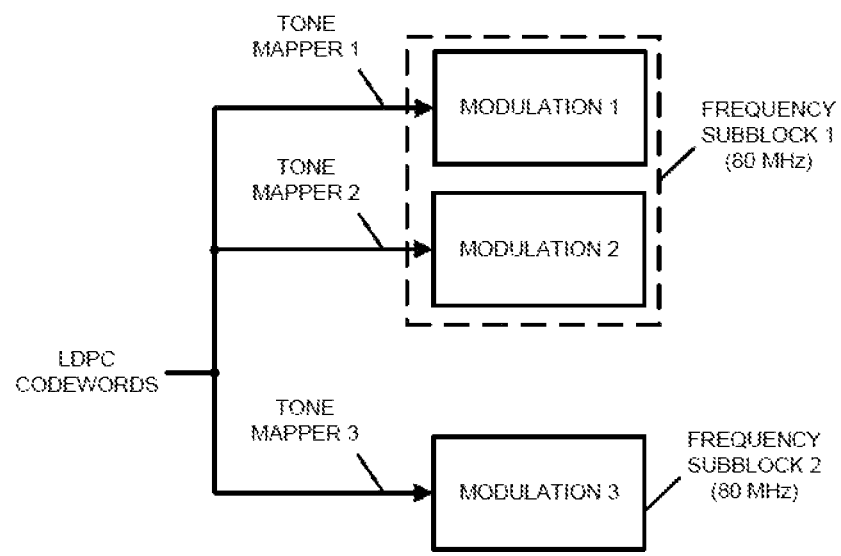
FIG. 9B is a drawing illustrating an example of multiple RU aggregation by one of the electronic devices of FIG. 1.

Furthermore, for a large-size RU aggregation, different RUs or frequency sub-blocks may have different allowed transmit power in different regulatory bands and/or may experience different interference levels in different RUs or frequency sub-blocks. Notably, the power limits in frequency bands for an access point specified by the Federal Communication Commission (FCC) may be: 30 dBm in 2.4 GHz; 30 dBm in 5.15-5.25 GHz, 24 dBm in 5.25-5.35 dBm; 24 dBm in 5.47-5.725 GHz; and 30 dBm in 5.725-5.85 GHz. Consequently, in some embodiments, different MCSs or levels may be used in different large-size RUs or different frequency sub-block. This capability may result in throughput gain. Note that joint LDPC encoding may be used across all RUs or frequency sub-blocks. Therefore, the same coding rate may be used. However, each large-size RU or frequency sub-block may use a different modulation level and a different $D_{CM}$ policy. This is illustrated in FIGS. 9A and 9B, which presents drawings illustrating examples of multiple RU aggregation. Moreover, Table 6 presents examples of different modulation and coding parameters. Note that is simulations for a 40 MHz RU and a 40 MHz RU with a 10 dB SINR difference, per-RU encoding using an optimal per-RU MCS may provide higher throughput than joint encoding with optimal per-RU modulation, which in turn may provide higher throughput than joint encoding with a common modulation.

TABLE 6

| Coding Rate | Modulation Level | MCS Level |
|---|---|---|
| 1/2 | BPSK, QPSK, 16QAM | 0, 1, 3 |
| 2/3 | 64QAM | 5 |
| 3/4 | QPSK, 16QAM, 64QAM, 256QAM, 1024QAM | 2, 4, 6, 8, 10 |
| 5/6 | 64QAM, 256QAM, 1024QAM | 7, 9, 11 |

Additionally, in order to support a per-RU or per-frequency sub-block modulation level, per-RU or per-frequency sub-block link quality information may be needed. Note that RU-based channel quality indicator (CQI) feedback is supported in IEEE 11ax. However, a link-adaptation technique with per-RU or per-frequency sub-block link quality may need to be defined.

In order to support fast link adaptation, link quality information may be included in block acknowledgments. For example, the link quality information may include: receiver RSSI, a signal-to-interference-plus-noise ratio (SINR), a transmit power, a recommended MCS level, a recommended number of spatial streams, and/or an LDPC codeword error rate (WER). Note that WER may be estimated from an LDPC parity check (an additional cyclic redundancy check or CRC may not be needed). Thus, in order to support per-RU or per-frequency sub-block modulation, per-RU or per-frequency sub-block link quality information (and, more generally, fast-link adaptation information) may be provided in or appended to a block acknowledgment, which may be transmitted after a data packet is received.

Note that allowing a different modulation level on different RUs or frequency sub-blocks may be equivalent to introducing more MCS levels. For example, using equal RU sizes, the new MCS levels may provide one or more new data rates per sub-carrier per stream. Even without per-RU channel information or RUs having similar quality, the new MCS combination modes may provide some throughput gain by introducing the new rates. Therefore, there may not be a need to update the link-adaptation technique.

Moreover, note that some modes may have the same data rate as an existing MCS level, but the performance may be better with per-RU or per-frequency sub-block channel quality information. For example, if a transmitter knows that a second RU (RU 2) has a few dB higher SNR than a first RU (RU 1), using a first MCS (MCS 1) on RU 1 and a third MCS (MCS 3) on RU 2 may outperform using MCS 2 across the RUs. Tables 7 and 8 present examples of different modulation and coding parameters.

TABLE 7

| MCS Level | Code Rate | Modulation | Nbpscs | Ndbpscs |
| --- | --- | --- | --- | --- |
| 0 | 1/2 | BPSK | 1 | 0.5 |
| 1 | 1/2 | QPSK | 2 | 1 |
| 2 | 3/4 | QPSK | 2 | 1.5 |
| 3 | 1/2 | 16QAM | 4 | 2 |
| 4 | 3/4 | 16QAM | 4 | 3 |
| 5 | 2/3 | 64QAM | 6 | 4 |
| 6 | 3/4 | 64QAM | 6 | 4.5 |
| 7 | 5/6 | 64QAM | 6 | 5 |
| 8 | 3/4 | 256QAM | 8 | 6 |
| 9 | 5/6 | 256QAM | 8 | 6.67 |
| 10 | 3/4 | 1024QAM | 10 | 7.5 |
| 11 | 5/6 | 1024QAM | 10 | 8.33 |
| 12 | 3/4 | 4096QAM | 12 | 9 |
| 13 | 5/6 | 4096QAM | 12 | 10 |
| 15 | 1/2 | BPSK + DCM | 0.5 | 0.25 |

TABLE 8

| RU1 MCS Level | Code Rate | RU1 Modulation | RU2 Modulation | Ndbpscs |
| --- | --- | --- | --- | --- |
| 15 | 1/2 | BPSK + DCM | BPSK | 0.375 |
|  |  |  | QPSK | 0.625 |
| 0 | 1/2 | BPSK | QPSK | 0.75 |
|  |  |  | 16QAM | 1.25 |
| 1 | 1/2 | QPSK | 16QAM | 1.5 |
| 2 | 3/4 | QPSK | 16QAM | 2.25 |
|  |  |  | 64QAM | 3 |
| 4 | 3/4 | 16QAM | 64QAM | 3.75 |
|  |  |  | 256QAM | 4.5 |
| 6 | 3/4 | 64QAM | 256QAM | 5.25 |
|  |  |  | 1024QAM | 6 |
| 7 | 5/6 | 64QAM | 256QAM | 5.83 |
|  |  |  | 1024QAM | 6.67 |
| 8 | 3/4 | 256QAM | 1024QAM | 6.75 |
|  |  |  | 4096QAM | 7.5 |
| 9 | 5/6 | 256QAM | 1024QAM | 7.5 |
|  |  |  | 4096QAM | 8.33 |
| 10 | 3/4 | 1024QAM | 4096QAM | 8.25 |
| 11 | 5/6 | 1024QAM | 4096QAM | 9.17 |

Moreover, the proposed MCS combination modes may limit the MCS combination modes to only allow one modulation level difference on different RUs or frequency sub-blocks. (MCS 0 and MCS 3 may be an exception). Note that a two modulation-level difference may lead to a four MCS level difference (except that binary phase shift keying or BPSK 1/2 and 16 quadrature amplitude modulation or QAM 1/2 may have a three MCS level difference). In addition, a four MCS level may need approximately a 12 dB SINR difference. Furthermore, a high modulation level may have a higher error vector magnitude (EVM) requirement, which may lead to a lower transmit power and, thus, an even larger SINR gap between the RUs. A very large SINR gap between RUs may be a corner case. Consequently, the constraint on the modulation level difference may only apply to up to a 256 QAM modulation level. Higher modulation cases may have smaller throughput gain. Also, a 1024 QAM and even higher modulation levels may require very strict transmit EVM and may lead to big transmit power reduction, which may reduce the gain.

Additionally, in the communication techniques, the RU aggregation modes that allow different modulation level may be limited. Notably, different modulation on different frequency sub-blocks may be allowed for the cases that all the allocated frequency sub-blocks have a similar number of tones allocated to a station. Defining the total number of tones allocated to the station within frequency sub-block 1, 2, etc. as $n_0$, $n_1$, etc. Then, for the set of N with any element nk greater than 0, the maximum value of N may be less than or equal to two times the minimum value of N, examples may include: a 484 tone RU and a 484 tone RU; a 996 tone RU and a 996 tone RU; a 484 tone RU and a 996 tone RU; a 996 tone RU, a 996 tone RU, and a 996 tone RU; a 484 tone RU, a 996 tone RU and a 996 tone RU.

Note that for RU aggregation within one frequency sub-block, the communication techniques may allow large-size RU aggregations with the same RU sizes or that the largest RU size is double the size of the smallest RU (and, more generally, has a size that is an integer multiple of the size of the smallest RU). For example, a 242 tone RU and a 242 tone RU, or a 242 tone RU and a 484 tone RU.

We now describe embodiments of the RU frequency sub-block parser. For RU aggregation with joint tone mapping (such as RU aggregation within one frequency sub-block) a RU parser may not be needed. Notably, an LDPC tone mapper may parse the coded bits to the RU.

In a first mode, for RU aggregation with RUs from different frequency sub-blocks, separate tone mapping may be used for each frequency sub-block and the same modulation may be used across the RUs. For example, the RU parser may be similar to segment parser. This may achieve the best diversity for each LDPC codeword. Moreover, for two RUs with the same size, each block of Ncbpss (the number of coded bits per symbol per spatial stream) may go to the allocated RUs in a round robin way. Notably, $$y_{k,l} = x_m,$$

$$m = 2s \cdot \left\lfloor \frac{k}{s} \right\rfloor + l \cdot s + (k \bmod s), k = 0, 1, \ldots, \frac{N_{cbpss}}{2} - 1,$$

and where $x_m$ is a bit m of a block of Ncbpss bits, m is between 0 and Ncbpss−1, and l is the order of RUs allocated to a station from lower frequency to higher frequency. Note that, assuming two RUs on two frequency sub-blocks are allocated to the station, l equals 0 or 1. Moreover, $y_{k,l}$ is bit k of the RU order l of the station. s equals the maximum of 1 and Nbpscs/2.

For an RU combination with different size RUs, the bits may be parsed to the RUs proportional to the RU size. Moreover, for aggregation of RUs from two frequency sub-blocks, the total number of tones allocated to a station within a frequency sub-block 1 and a frequency sub-block 2 may be defined as $n_0$ and $n_1$. Note that N may be the greatest common divisor of no and $n_1$. Then, $s \cdot n_0/N$ bits may be parsed to the frequency sub-blocks with $n_0$ tones allocated to the station and $s \cdot n_1/N$ bits may be parsed to the frequency sub-blocks with $n_0$ tones allocated to the station. Notably, $$y_{k,l} = x_m,$$
$$m = \frac{(n_0 + n_1)}{N} s \cdot \left\lfloor \frac{N \cdot k}{n_l \cdot s} \right\rfloor + l \cdot \frac{n_0}{N} \cdot s + \left(k \bmod\left(\frac{n_l}{N} \cdot s\right)\right),$$
$$k = 0, 1, \ldots, N_{cbpss} \cdot \frac{n_l}{n_0 + n_1} - 1,$$

and where l is the order of frequency sub-blocks that containing some RU(s) allocated to the station. Assume that all of the RUs allocated to the station park in two frequency sub-blocks, then l equals 0 or 1. Note that $y_{k,l}$ is bit k of the frequency sub-blocks of order l for the station.

Figure 10:
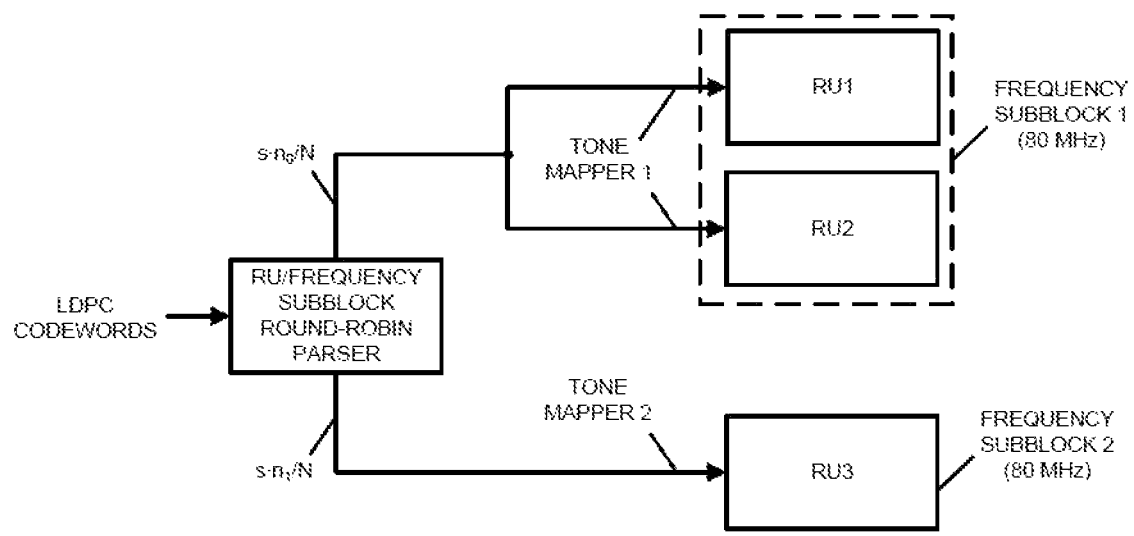
FIG. 10 is a drawing illustrating an example of multiple RU aggregation by one of the electronic devices of FIG. 1.

As shown in FIG. 10, which presents a drawing illustrating an example of multiple RU aggregation, the first mode may be extended to more than two RU cases. For L RUs with the same size, each block of Ncbpss coded bits may go to the allocated RUs in a round robin way, where each allocated RU may be assigned s bits each round, and s equals the maximum of 1 and Nbpscs/2.

$$y_{k,l} = x_m,$$
$$m = L \cdot s \cdot \left\lfloor \frac{k}{s} \right\rfloor + l \cdot s + (k \bmod s), k = 0, 1, \ldots, \frac{N_{cbpss}}{L} - 1,$$

and where $x_m$ is bit m of a block of Ncbpss bits and m equals 0 to Ncbpss-1, l is the order of RUs allocated to the station from lower frequency to higher frequency (l equals 0 to L−1), and $y_{k,l}$ is bit k of the $l^{th}$ allocated RU to the station.

More generally, for L RUs or frequency sub-block combinations with different sizes, each block of Ncbpss coded bits may be parsed into the RUs or frequency sub-blocks proportional to the RU or frequency sub-block size in a round robin way. The number of coded bits assigned to the RUs or frequency sub-blocks in each round may be proportional to the RU size or frequency sub-block size.

Using the frequency sub-block parsing below as an example, RU parsing may have similar equations. For L frequency sub-blocks, the total number of tones allocated to the station within the $l^{th}$ frequency sub-block may be defined as $n_l$. Note that N may be the greatest common divisor of all $n_l$, where l is between 0 and L−1. Then, the $s \cdot n_l/N$ bits are parsed to frequency sub-block l in each round and repeat. Moreover, s equals the maximum of 1 and Nbpscs/2. Notably, $$y_{k,l} = x_m,$$
$$m = \frac{\sum_{i=0}^{L} n_i}{N} s \cdot \left\lfloor \frac{N \cdot k}{n_l \cdot s} \right\rfloor + \frac{\sum_{i=0}^{l-1} n_i}{N} \cdot s + \left(k \bmod \frac{n_l}{N} \cdot s\right),$$
$$k = 0, 1, \ldots, N_{cbpss} \cdot \frac{n_l}{\sum_{i=0}^{L} n_i} - 1,$$

and where l is the order of frequency sub-blocks that contain some RU(s) allocated to the station from lower frequency to higher frequency (l is between 0 and L−1), and $y_{k,l}$ is bit k of the frequency sub-blocks of order l for the station.

In a second mode of the RU or frequency sub-block parser, for RU aggregation with RUs from different frequency sub-blocks, separate tone mapping for each frequency sub-block and different modulation for the RU or frequency sub-block may be used. Notably, in order to provide per-RU or per-frequency sub-block WER, an existing segment parser (such as the RU parser) may not work, because each LDPC codeword may be parsed to different RU or frequency sub-blocks. Instead, a sequential RU parser may be used. In this parser, the coded bits may be parsed to frequency sub-blocks in a sequential order, filling $Nbpscs_i \cdot Nsd\_fs_i$ of the total coded bits Ncbpss total for frequency sub-block i. Note that $Nsd\_fs_i$ may be the number of data tones of all RUs allocated to the station within frequency sub-block I, and $Nbpscs_i$ may be is the Nbpscs of the modulation level applied within frequency sub-block i. Moreover, within each frequency sub-block, the per-frequency sub-block LDPC tone mapper may be used to map the coded bits to the data tones. If per-RU modulation is allowed for an inner frequency sub-block RU aggregation, the RU parser may be similar. In this case, $Nsd\_fs_i$ may be changed to $Nsd\_ru_i$, where i represents $i^{th}$ RU allocated to the station.

Moreover, in a second mode of the RU or frequency sub-block parser, when different modulation is applied to different frequency sub-blocks, a proportional round robin parser may be applied, which can provide better diversity gain. In this parser, each block of Ncbpss coded bits may be parsed into the RUs or frequency sub-blocks in a round robin way and proportional to the product of the frequency sub-block size and the Nbpscs of each frequency sub-block.

Notably, in the second mode, for RU aggregation with RUs from different frequency sub-blocks, there may be separate tone mapping for each frequency sub-block and different modulation for the RUs or frequency sub-blocks. The second option may use a proportional round robin parser. In the cases that per frequency sub-block WER is not provided, the proportional round robin parser can achieve better diversity gain. In general, for L RUs or frequency sub-block combinations, each block of Ncbpss coded bits may be parsed into the RUs or frequency sub-blocks proportional to the RU or frequency sub-block size times the Nbpscs of each RU or frequency sub-block in a round robin way.

For example, for L frequency sub-blocks, a total number of tones allocated to a station within the l-th frequency sub-block is defined as $n_l$. The number of bits per stream per subcarrier for the l-th frequency sub-block is Nbpscs_l, where l equals 0, 1, . . . L−1. Moreover, the total number of modulated bits in the l-th frequency sub-block is given by Nbits_l=$n_l$·Nbpscs_l, and $$N_{cbpss} = \Sigma_{i=0}^{L-1} N_{bits\_i}.$$

Note that N may be the greatest common divisor of all Nbits_l, for =0, 1, . . . L−1. Next, parse sblk_l=s·Nbits_l/N bits to frequency sub-block in each round and repeat. Furthermore, s equals the maximum of 1 and Nbpscs/2, and Nbpscs equals the minimum of Nbpscs_l. Then, $$y_{k,l} = x_m,$$

-continued $$m = \sum_{l=0}^{L-1} \text{sblk\_1} \cdot \left\lfloor \frac{k}{sblk_l} \right\rfloor + \sum_{i=0}^{l-1} sblk_i + (k \bmod sblk_l),$$

where l is the order of frequency sub-blocks that contain some RU(s) allocated to a station from lower frequency to higher frequency, and l equals 0 to L−1, where L is the number of frequency sub-blocks. Additionally, $y_{k,l}$ is bit k of the frequency sub-blocks order l for the station.

Figure 11:
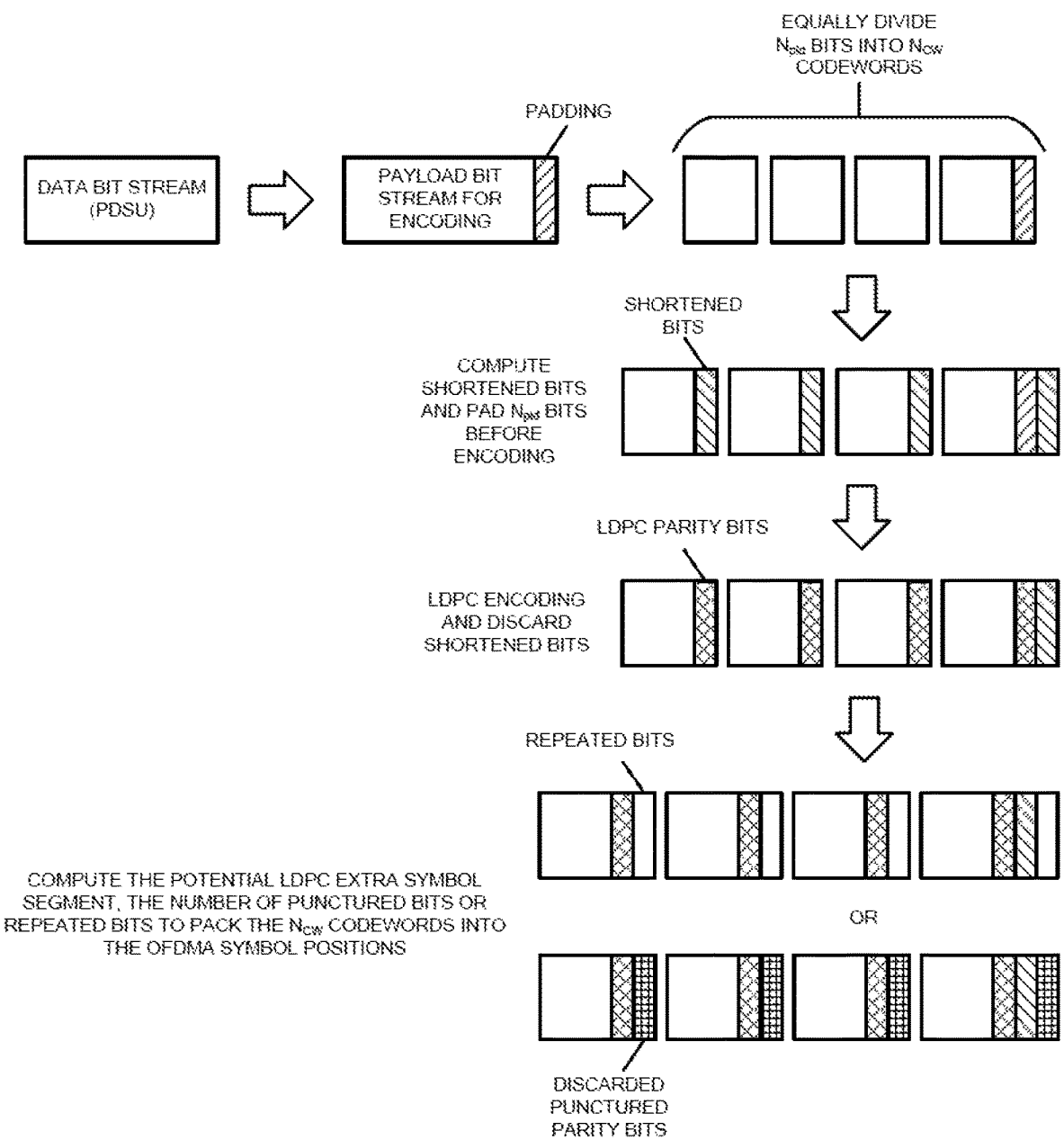
FIG. 11 is a drawing illustrating an example of low-density parity code (LDPC) coding on multiple aggregated RUs with different modulation coding schemes (MCSs) by one of the electronic devices of FIG. 1.
Figure 12:
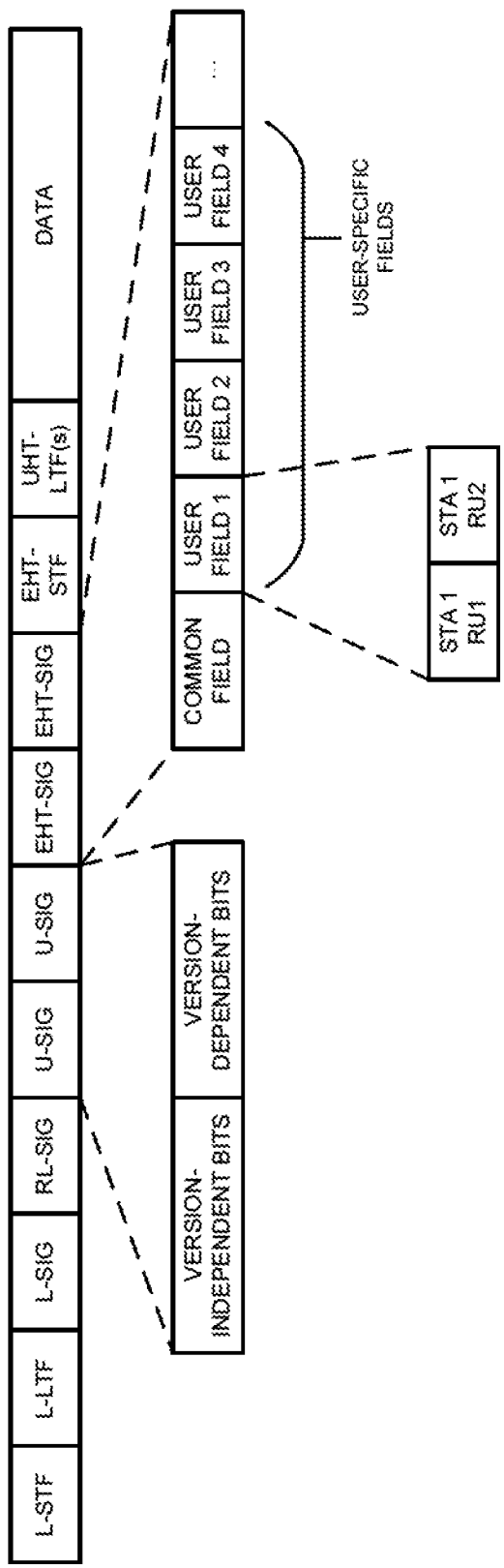
FIG. 12 is a drawing illustrating an example of preamble coding of a frame communicated by one of the electronic devices of FIG. 1.

FIG. 11 presents a drawing illustrating an example of LDPC coding on multiple aggregated RUs with different MCSs. Notably, FIG. 11 summarizes the LDPC coding on aggregated RUs with different modulation levels. A data bit stream (PSDU) has a length of $N_{PSDU}$ octets. The physical layer parameters may be selection may include, based at least in part on the MCS-level, calculating the number of data bits per stream ($N_{DBPS}$); based at least in part on the STBC, determining the $m_{STBC}$, etc. For RU aggregation, $N_{DBPS}$ may be calculated from the sum of the number of data bits per stream for each RU ($\Sigma N_{DBPS\_RUk}$). Moreover, the initial number of OFDMA symbols ($N_{SYM,init}$) may be calculated as $m_{STBC}$ times the sum of eight times $N_{PSDU}$ plus $N_{service}$ divided by $m_{STBC}$ times $N_{DBPS}$. Furthermore, pre-FEC padding may be computed based at least in part on $N_{SYM,init}$ and a factor, and post-FEC padding bits may include the number of data bits per stream, short, which is the sum of the number of data bits per stream, short for each RU.

Then, padding bits (include $N_{PAD}$ Pre-FEC bits) may be added to $N_{pld}$ payload bits (including the service field, PSDU, etc.). Note that the length of the LDPC codeword $L_{LDPC}$ may be determined by $N_{avbits}$ and $N_{pld}$, where $N_{avbits}$ may equal $N_{SYM,init}$ minus $m_{STBC}$ times $N_{CBPS}$ plus $m_{STBC}$ times $N_{CBPS\_last,init}$. The total number of LDPC codewords $N_{CW}$ may be $N_{avbits}$ divided by $L_{LDPC}$.

Moreover, the $N_{pld}$ data bits may be divided into $N_{CW}$ codewords. Furthermore, the number of shortened bits may be computed and padded onto the $N_{pld}$ data bits before encoding. Note that the actual payload bits per codeword may not be $L_{LDPC}$ times R. Instead, it may depend on the number of shortened bits $N_{shrt}$.

Additionally, there may be LDPC encoding and the shortened bits may be discarded. Then, the potential LDPC extra symbol segment may be computed, and the repeated bits may be copied or the number of punctured bits may be discarded in order to pack the $N_{CW}$ codewords into the desired OFDMA symbol positions.

Moreover, there are different options for preamble signaling. As shown FIG. 12, which presents a drawing illustrating an example of preamble coding of a frame, in a first option, an extremely high throughput-signal (EHT-SIG) user-specific field may be used, where each user may have only one EHT-SIG user-specific field. For users with multiple RU allocation, the one user field may be used for all RUs allocated to the station.

If different modulation levels are supported, a per-RU or per-frequency sub-block modulation bitmap subfield may be defined in the user field. Notably, if different modulation is only allowed on different frequency sub-blocks, the bitmap may be the frequency sub-block bitmap. Note that the size of this sub-field may equal to the maximum number of RUs or frequency sub-blocks that allow different modulation levels. Moreover, each bit in the bitmap may indicate the modulation difference for a RU or frequency sub-block. For example, a value of '1' may indicate one modulation level higher than the modulation used in the basic MCS. Alternatively, a value of '0' may indicate that the same modulation level as the basic MCS is used. Notably, as examples, the basic MCS may be MCS2 (QPSK 3/4) and the per-RU modulation bitmap may be [0,1] (RU1 MCS2, RU2 MCS4), or the basic MCS may be MCS0 (BPSK 1/2) and the per-RU modulation bitmap may be [1,0] (RU1 MCS1, RU2 MCS0). Table 9 presents an example of preamble signaling information.

TABLE 9

| Subfields in User Field | Length | Definition |
|---|---|---|
| Station identifier | 11 bits | Station identification |
| Basic MCS | 4 bits | Lowest MCS level of all the RUs allocated to the station |
| Per-RU modulation bitmap (or per-frequency sub-block modulation bit map) | 2,3 or 4 bits (equal to a number of RUs allowed to have different modulation) | Indicate the modulation-level difference from the basic MCS of each RU (frequency sub-block) |

Figure 13:
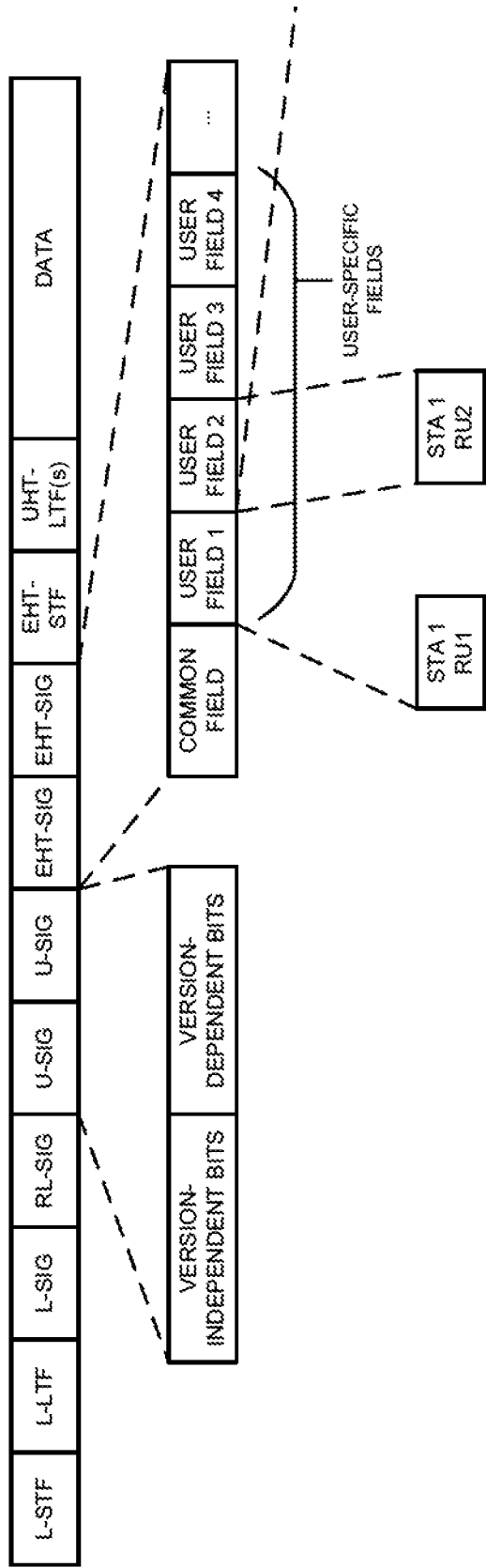
FIG. 13 is a drawing illustrating an example of preamble coding of a frame communicated by one of the electronic devices of FIG. 1.

Furthermore, as shown FIG. 13, which presents a drawing illustrating an example of preamble coding of a frame, in a second option, in an EHT-SIG user-specific field, each user may have more than one user field. For users with multiple RU allocation, one user field may be used for each RU allocated to the user. The user fields for the same user may use same station identifier (STAID). Additionally, if a different modulation level is allowed, each user field may indicate the physical layer parameters for the corresponding RU. Table 10 presents an example of preamble signaling information for RU1, and Table 11 presents an example of preamble signaling information for RU2. Thus, in these embodiments, parameters for different RUs may specified with preamble signaling information in different subfields or fields.

TABLE 10

| Subfields in User Field | Length | Definition |
|---|---|---|
| Station identifier | 11 bits | Station identification |
| MCS | 4 bits | MCS for RU1 |

TABLE 11

| Subfields in User Field | Length | Definition |
|---|---|---|
| Station identifier | 11 bits | Station identification |
| MCS | 4 bits | MCS for RU2 |

In summary, the embodiments of the communication techniques allow the electronic device and the recipient electronic device to communicate an OFDMA frame using multiple predefined RUs, thereby improving spectral efficiency and improving the communication performance of the electronic device and the recipient electronic device.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 14 presents a block diagram of an electronic device 1400 (which may be a cellular telephone, a smartwatch, an access point, a wireless speaker, an IoT device, another electronic device, etc.) in accordance with some embodiments. This electronic device includes processing subsystem 1410, memory subsystem 1412 and networking subsystem 1414. Processing subsystem 1410 includes one or more devices configured to perform computational operations. For example, processing subsystem 1410 can include one or more microprocessors, application-specific integrated circuits (ASICs), microcontrollers, graphics processing units (GPUs), programmable-logic devices, and/or one or more digital signal processors (DSPs).

Memory subsystem 1412 includes one or more devices for storing data and/or instructions for processing subsystem 1410, and/or networking subsystem 1414. For example, memory subsystem 1412 can include dynamic random access memory (DRAM), static random access memory (SRAM), a read-only memory (ROM), flash memory, and/or other types of memory. In some embodiments, instructions for processing subsystem 1410 in memory subsystem 1412 include: program instructions or sets of instructions (such as program instructions 1422 or operating system 1424), which may be executed by processing subsystem 1410. For example, a ROM can store programs, utilities or processes to be executed in a non-volatile manner, and DRAM can provide volatile data storage, and may store instructions related to the operation of electronic device 1400. Note that the one or more computer programs may constitute a computer-program mechanism, a computer-readable storage medium or software. Moreover, instructions in the various modules in memory subsystem 1412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1410. In some embodiments, the one or more computer programs are distributed over a network-coupled computer system so that the one or more computer programs are stored and executed in a distributed manner.

In addition, memory subsystem 1412 can include mechanisms for controlling access to the memory. In some embodiments, memory subsystem 1412 includes a memory hierarchy that comprises one or more caches coupled to a memory in electronic device 1400. In some of these embodiments, one or more of the caches is located in processing subsystem 1410.

In some embodiments, memory subsystem 1412 is coupled to one or more high-capacity mass-storage devices (not shown). For example, memory subsystem 1412 can be coupled to a magnetic or optical drive, a solid-state drive, or another type of mass-storage device. In these embodiments, memory subsystem 1412 can be used by electronic device 1400 as fast-access storage for often-used data, while the mass-storage device is used to store less frequently used data.

Networking subsystem 1414 includes one or more devices configured to couple to and communicate on a wired and/or wireless network (i.e., to perform network operations), such as: control logic 1416, one or more interface circuits 1418 and a set of antennas 1420 (or antenna elements) in an adaptive array that can be selectively turned on and/or off by control logic 1416 to create a variety of optional antenna patterns or 'beam patterns.' Alternatively, instead of the set of antennas, in some embodiments electronic device 1400 includes one or more nodes 1408, e.g., a pad or a connector, which can be coupled to the set of antennas 1420. Thus, electronic device 1400 may or may not include the set of antennas 1420s. For example, networking subsystem 1414 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 1414 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1400 may use the mechanisms in networking subsystem 1414 for performing simple wireless communication between the electronic devices, e.g., transmitting advertising or frame frames and/or scanning for advertising frames transmitted by other electronic devices.

Within electronic device 1400, processing subsystem 1410, memory subsystem 1412 and networking subsystem 1414 are coupled together using bus 1428 that facilitates data transfer between these components. Bus 1428 may include an electrical, optical, and/or electro-optical connection that the subsystems can use to communicate commands and data among one another. Although only one bus 1428 is shown for clarity, different embodiments can include a different number or configuration of electrical, optical, and/or electro-optical connections among the subsystems.

In some embodiments, electronic device 1400 includes a display subsystem 1426 for displaying information on a display, which may include a display driver and the display, such as a liquid-crystal display, a multi-touch touchscreen, etc. Display subsystem 1426 may be controlled by processing subsystem 1410 to display information to a user (e.g., information relating to incoming, outgoing, or an active communication session).

Electronic device 1400 can also include a user-input subsystem 1430 that allows a user of the electronic device 1400 to interact with electronic device 1400. For example, user-input subsystem 1430 can take a variety of forms, such as: a button, keypad, dial, touch screen, audio input interface, visual/image capture input interface, input in the form of sensor data, etc.

Electronic device 1400 can be (or can be included in) any electronic device with at least one network interface. For example, electronic device 1400 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 1400, in alternative embodiments, different components and/or subsystems may be present in electronic device 1400. For example, electronic device 1400 may include one or more additional processing subsystems, memory subsystems, networking subsystems, and/or display subsystems. Additionally, one or more of the subsystems may not be present in electronic device 1400. Moreover, in some embodiments, electronic device 1400 may include one or more additional subsystems that are not shown in FIG. 14. In some embodiments, electronic device may include an analysis subsystem that performs at least some of the operations in the communication techniques. Also, although separate subsystems are shown in FIG. 14, in some embodiments some or all of a given subsystem or component can be integrated into one or more of the other subsystems or component(s) in electronic device 1400. For example, in some embodiments program instructions 1422 are included in operating system 1424 and/or control logic 1416 is included in the one or more interface circuits 1418.

Moreover, the circuits and components in electronic device 1400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1414. This integrated circuit may include hardware and/or software mechanisms that are used for transmitting wireless signals from electronic device 1400 and receiving signals at electronic device 1400 from other electronic devices. Aside from the mechanisms herein described, radios are generally known in the art and hence are not described in detail. In general, networking subsystem 1414 and/or the integrated circuit can include any number of radios. Note that the radios in multiple-radio embodiments function in a similar way to the described single-radio embodiments.

In some embodiments, networking subsystem 1414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1422, operating system 1424 (such as a driver for an interface circuit in networking subsystem 1414) or in firmware in an interface circuit networking subsystem 1414. Alternatively or additionally, at least some of the operations in the communication techniques may be implemented in a physical layer, such as hardware in an interface circuit in networking subsystem 1414. In some embodiments, the communication techniques are implemented, at least in part, in a MAC layer and/or in a physical layer in an interface circuit in networking subsystem 1414.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna node configured to communicatively couple to an antenna; and
an interface circuit, communicatively coupled to the antenna node, configured to communicate with a recipient electronic device, wherein the interface circuit is configured to:
transmit, from the antenna node, an orthogonal frequency division multiple access (OFDMA) frame intended for the recipient electronic device, wherein the OFDMA frame comprises multiple predefined resource units (RUs) allocated to the recipient electronic device in a set of predefined RUs having associated frequency bandwidths, and
wherein the multiple predefined RUs comprise two or more first predefined RUs having a first number of tones greater than or equal to a predefined amount, and
wherein the electronic device is configured to perform:
error coding using an error code of bits in the two or more first predefined RUs;
parsing error encoded bits into the two or more first predefined RUs;
one of:
tone mapping the error encoded bits in the two or more first predefined RUs using a common tone-mapping technique or different tone mapping techniques for the two or more first predefined RUs; or
interleaving of the error encoded bits in the two or more first predefined RUs; and symbol mapping tone-mapped bits or interleaved bits using a common constellation or different constellations for the two or more first predefined RUs.

2. The electronic device of claim 1, wherein the multiple predefined RUs have different numbers of tones.

3. The electronic device of claim 1, wherein the interface circuit is configured to transmit, from the antenna node, a second OFDMA frame intended for the recipient electronic device;
wherein the OFDMA frame comprises multiple second predefined RUs allocated to the recipient electronic device in the set of predefined RUs having the associated frequency bandwidths;
wherein the multiple second predefined RUs comprise two or more second predefined RUs having a second number of tones less than the predefined amount; and
wherein the two or more second predefined RUs have a combined frequency bandwidth that does not cross a 20 MHz boundary among the set of predefined RUs.

4. The electronic device of claim 1, wherein the two or more first predefined RUs are separated by a puncture hole corresponding to a frequency bandwidth excluding transmitted energy.

5. The electronic device of claim 1, wherein the interface circuit is configured to transmit, from the antenna node, a second OFDMA frame intended for the recipient electronic device;
wherein the OFDMA frame comprises multiple second predefined RUs allocated to the recipient electronic device in the set of predefined RUs having the associated frequency bandwidths;
wherein the multiple second predefined RUs comprise two or more second predefined RUs having a second number of tones less than the predefined amount; and
wherein the two or more second predefined RUs are adjacent to each other and are combined to form a contiguous frequency bandwidth.

6. The electronic device of claim 5, wherein the electronic device is configured to perform:
error coding using an error code of bits in the contiguous frequency bandwidth;
interleaving of error encoded bits in the contiguous frequency bandwidth;
parsing interleaved bits into the two or more second predefined RUs; and
symbol mapping the interleaved bits in the two or more second predefined RUs using a common constellation for the two or more second predefined RUs.

7. The electronic device of claim 5, wherein the electronic device is configured to perform:
error coding using an error code of bits in the contiguous frequency bandwidth;
tone mapping of error encoded bits in the contiguous frequency bandwidth;
parsing tone-mapped bits into the two or more second predefined RUs; and
symbol mapping the tone-mapped bits in the two or more second predefined RUs using a common constellation or different constellations for the two or more second predefined RUs.

8. The electronic device of claim 1, wherein the different constellations are used when the two or more first predefined RUs are included in different frequency sub-blocks; and
wherein a given frequency sub-block has an 80 MHz bandwidth.

9. The electronic device of claim 1, wherein a given constellation corresponds to a given first predefined RU.

10. The electronic device of claim 1, wherein the two or more first predefined RUs in different frequency sub-blocks use different modulation and coding scheme (MCS) levels.

11. The electronic device of claim 10, wherein frequency sub-block has an 80 MHz bandwidth; and
wherein the two or more first predefined RUs with the different MCS levels have a common number of tones.

12. The electronic device of claim 10, wherein the two or more first predefined RUs with different MCS levels have a common frequency bandwidth or have frequency bandwidths that different by a factor of two.

13. The electronic device of claim 1, wherein the interface circuit is configured to receive, at the antenna node, a block acknowledgment associated with the recipient electronic device;
wherein the block acknowledgment comprises information specifying link quality between the electronic device and the recipient electronic device.

14. The electronic device of claim 13, wherein the interface circuit is configured to perform link adaptation based at least in part on the information; and
wherein the link adaptation is performed for a given predefined RU or for a given frequency sub-block comprising an 80 MHz bandwidth.

15. The electronic device of claim 1, wherein the multiple predefined RUs are allocated in different frequency sub-blocks; and
wherein the predefined RUs in different frequency sub-blocks have different numbers of tones.

16. The electronic device of claim 1, wherein encoded bits are parsed to frequency sub-blocks using a proportional round-robin technique and a number of parsed bits is proportional to a number of tones of the predefined RUs in each frequency sub-block.

17. A method for receiving an acknowledgment, comprising:
by an electronic device:
transmitting an orthogonal frequency division multiple access (OFDMA) frame intended for a recipient electronic device, wherein the OFDMA frame comprises multiple predefined resource units (RUs) allocated to the recipient electronic device in a set of predefined RUs having associated frequency bandwidths, and
wherein the multiple predefined RUs comprise two or more first predefined RUs having a first number of tones greater than or equal to a predefined amount; and
receiving the acknowledgment associated with the recipient electronic device, wherein the electronic device performs operations comprising:
error coding using an error code of bits in the two or more first predefined RUs;
parsing error encoded bits into the two or more first predefined RUs;
one of:
tone mapping the error encoded bits in the two or more first predefined RUs using a common tone-mapping technique or different tone mapping techniques for the two or more first predefined RUs; or
interleaving of the error encoded bits in the two or more first predefined RUs; and
symbol mapping tone-mapped bits or interleaved bits using a common constellation or different constellations for the two or more first predefined RUs.

18. The method of claim 17, wherein a given constellation corresponds to a given first predefined RU.

19. A recipient electronic device, comprising:
an antenna node configured to communicatively couple to an antenna; and
an interface circuit, communicatively coupled to the antenna node, configured to communicate with an electronic device, wherein the interface circuit is configured to:
  receive, at the antenna node, an orthogonal frequency division multiple access (OFDMA) frame associated with the electronic device, wherein the OFDMA frame comprises multiple predefined resource units (RUs) allocated to the recipient electronic device in a set of predefined RUs having associated frequency bandwidths, and
  wherein the multiple predefined RUs comprise two or more first predefined RUs having a first number of tones greater than or equal to a predefined amount; and
  receive, at the antenna node, a second OFDMA frame associated with the electronic device, wherein the OFDMA frame comprises multiple second predefined RUs allocated to the recipient electronic device in the set of predefined RUs having the associated frequency bandwidths,
  wherein the multiple second predefined RUs comprise two or more second predefined RUs having a second number of tones less than the predefined amount, and
  wherein the two or more second predefined RUs have a combined frequency bandwidth that does not cross a 20 MHz boundary among the set of predefined RUs.

20. The recipient device of claim 19, wherein the two or more second predefined RUs are adjacent to each other and are combined to form a contiguous frequency bandwidth.

* * * * *